3,575,853
WASTE WATER TREATMENT
Philip J. Gaughan, Charles A. Noll, and James K. Brown, Philadelphia, Pa., assignors to Laboratories Betz, Inc., Trevose, Pa.
Filed Dec. 24, 1968, Ser. No. 786,572
Int. Cl. C02c 5/02
U.S. Cl. 210—46                       13 Claims

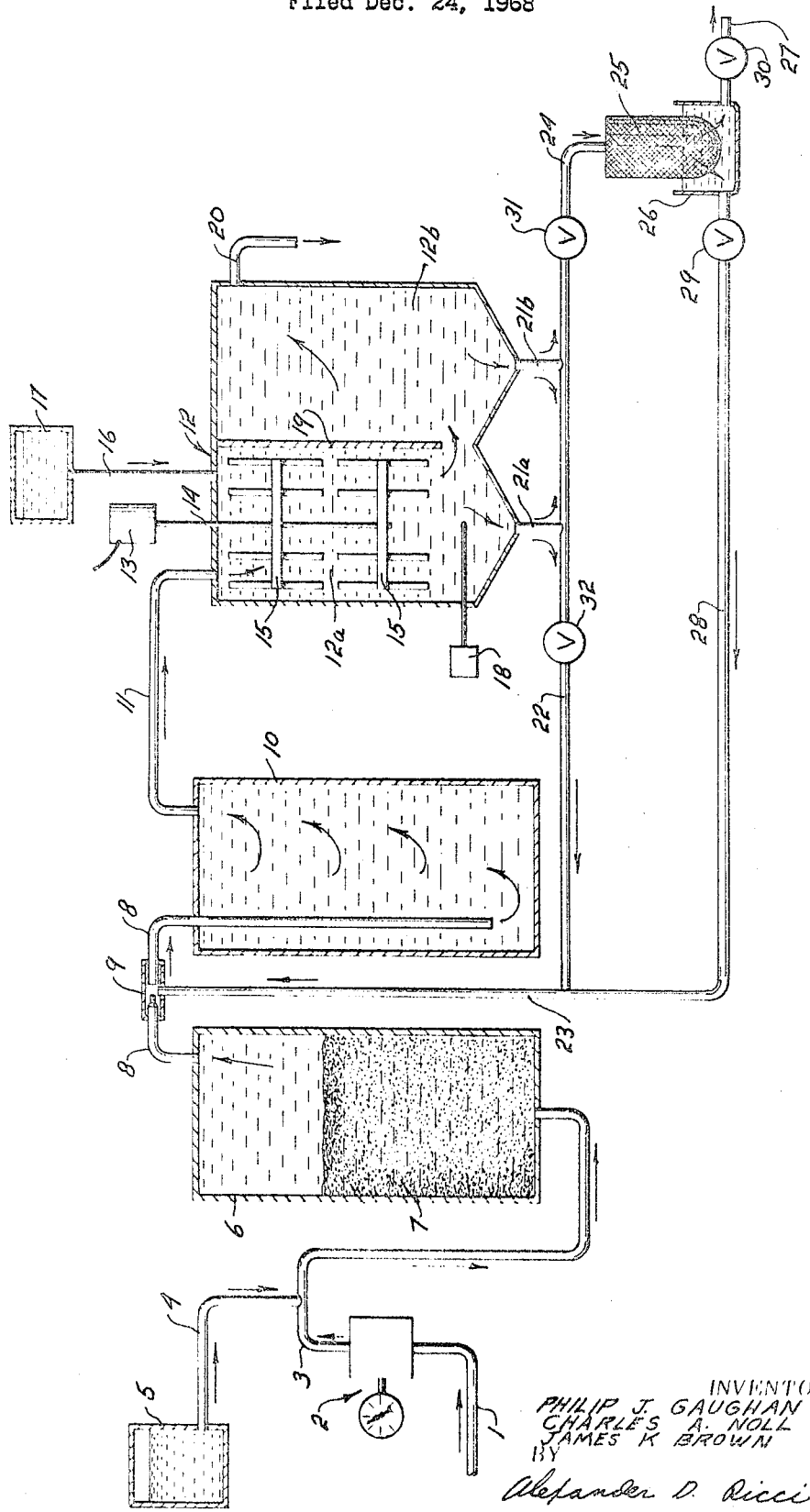

ABSTRACT OF THE DISCLOSURE

The present disclosure relates to a process and an apparatus for affecting the process for the removal of various contaminants from waste waters and in particular, from industrial waste waters.

Water systems are conventionally treated with chromate, phosphate and zinc compounds either alone or in combination with each other and with biocides and the present invention provides for the removal of these materials from the water and any oil dispersed therein prior to its disposal. The water is first acidified, passed through a unit containing a bed of metal particles, passed into a mixing tank and then into a flocculating tank where the water is brought to an alkaline pH. Various insoluble precipitates are formed which are separated from the solution by deposition in a settling tank and by filtration.

BACKGROUND OF THE INVENTION

Water-soluble chromates, organic and inorganic phosphates and water-soluble zinc compounds either alone or in combination with each other have found widespread use in the water treatment field. The use of these compounds or compositions containing the compounds save millions of dollars yearly due to their capacities to reduce scale formation and inhibit corrosion of metallic structures which convey or make use of water. Probably the most representative systems wherein these materials have found the most use are the industrial cooling water systems, wherein heat exchangers, cooling tower elements, condensers and the like are continually in contact with water. The areas of applications and the various compositions which are generally utilized for these purposes are amply described in U.S. Pats. 2,711,391; 2,793,932; 2,872,281 and 2,900,222.

In addition to the above, chromium compounds such as the water soluble chromates and chromic acid and zinc compounds are commonly used in the electroplating industry while zinc, zinc compounds are phosphates also find use as catalysts in many fields. Moreover various waste waters from chemical blending operations contain metallic ions such as aluminum, chromate and zinc which must be disposed. Accordingly, the present invention finds application where disposal of waters containing these metal ions is necessary as hereafter explained.

Although the aforementioned metal ions possess the described desirable capacities, a problem is encountered when they are contained in various solutions which must be passed to waste i.e. discarded into sewage systems, discharged into streams, ponds, lakes etc. The chromate ions like the zinc ions present in these waste waters may exert a toxic effect upon the marine and plant life existing in the streams, rivers, etc. In many instances the chromate containing compositions are used in conjunction with various biocides particularly where a cooling tower system is being treated. Most commonly these biocides belong to the phenol family and include phenols, the phenates and the halogenated phenols and phenates. These biocides accordingly exert their own toxic effects upon the life in the discharge streams because of their substantivity.

The industry has been aware of the undesirability of adding these contaminants to these natural waters and accordingly, has suggested many ways of diminishing the effects of these contaminants. The Federal and State governments have also recognized the need for keeping the natural waters as free of contaminants as possible and therefore have promulgated various regulations regarding the type materials and the amounts of these materials which may be discharged into the natural waters.

The recognition and previous attempts to resolve these problems have included methods for diluting the effluent waste waters to harmless concentrations of the contaminant which, however, requires large and expensive holding tanks or basins. Chemical treatments were the contaminants are precipitated and ion exchange methods have also been suggested. However, these methods have never reached any degree of commercial usage because of the relative ineffectiveness of the various methods and/or because of the rather large expense involved.

Likewise, evaporation processes have found little use since these processes require large and expensive holding basins such as the land requirements which must be adequate to hold the waste water of an installation during the lengthy evaporation period.

As is apparent then, there is a current widespread demand for a process which will not only render waste waters safe for disposal but one which would also permit this objective to be performed economically.

GENERAL DESCRIPTION OF THE INVENTION

After much research and development work directed to the above specified objectives, the present inventors discovered that the objectives could be attained by practicing the present invention as hereinafter more fully described.

The process of the invention may be generally described as the process for removing from an aqueous medium toxic multivalent metals which are in either salt or in ionized form and are dissolved in the aqueous medium. The aqueous medium may also contain oil dispersed throughout the biocides dissolved therein. The invention is more specifically directed to the removal of contaminants from industrial waste waters.

As earlier stated, waste waters derived from cooling systems in general, and cooling systems used in oil refining processes wherein there is some leakage of the oil into the cooling water, and in the electroplating industry in each instance contain various multivalent ions such as chromate ions, phosphate ions and zinc ions and in some cooling towers, the water may also contain some biocide. The waste water to be treated is generally obtained from the blowdown of the cooling towers or from the discharge of the electroplating process, and need not be supplied from one specific source but may be a combination of waters obtained from a number of systems. For example, in the case of cooling systems the waste waters may be derived from a number of different cooling systems which are directed to a common system where the water is treated according to the present invention. Likewise, the discharge of an electroplating process may be admixed with the waste water derived from a cooling process. The only contingencies are that the approximate contents of the ions should be known in order to assure proper treatment of the water.

The aqueous medium containing the contaminants is treated according to a process which comprises the following steps:

(1) acidifying the aqueous medium containing the contaminant ions (2) passing said acidified aqueous medium through and in contact with a bed of particles of a metal to thereby dissolve a portion of said particles, said metal of the particles being capable in its dissolved state and in said acidic medium of reducing the metal ions of said dissolved salts to their lowest valence state and in turn being oxidized to its higher valence state;

(3) after substantially all of the metal ions of said dissolved salts have been reduced to their lowest valence state, converting the aqueous acidic medium to an aqueous alkaline madium where the reduced metal ions of said dissolved salt and the oxidized metal ions derived from the metal particles form precipitate which is insoluble in the alkaline medium.

(4) allowing the combined precipitates of the metals to form and settle; and (5) separating the precipitate from the remaining aqueous medium.

The toxic salts or ions which are commonly found in the waste water include the phosphates and toxic salts which contain metal ions selected from the group consisting of chromium in its hexavalent state, chromium in its trivalent state, and zinc in its bivalent state, mixtures of the salts containing the respective ions and mixtures of the phosphates with these salts.

In step (1) of the process the aqueous medium can be acidified with any acid or acidic material which possesses the capacity for dissolving the metal particles as described in step (2). The most common and the most economical acids include the mineral acids such as hydrochloric acid, sulphuric acid, nitric acid, etc. The concentration of the acid utilized in step (1) is open for variation depending upon the particular water being treated. However, for most purposes a concentrated acid such as a 66° Baumé acid has proven to be quite effective since the acid requirements of the process are fulfilled with the minimum addition of diluent water. Since the waste water from the blowdown of the cooling system will generally have a pH of approximately 6.5, sufficient acid should be added in order to assure that the pH of the aqueous acidified medium is within the range of about 1 to 5, and more specifically in the range of from 2 to 3. In order to obtain the specified pH range approximately 1 to 2 pounds of acid per thousand gallons of water should be added.

The acidified aqueous medium is then passed through a bed of metal particles. The metal of the particles may be any one of iron, aluminum, magnesium, zinc and mixtures of these metals. Although it is possible to use specially prepared particles of these metals, it is convenient to use waste metal particles which are obtained from machine shops and the like where waste metal turnings and filings are always available. The latter source of the metal particles of course, lends an economical feature to the invention from the aspect of raw materials cost since machine shops are always looking towards an available market for disposing of the metal turnings.

The metal particles utilized in this step need not be of any specific dimension or shape, however it is desirable to have the particles in such form and size to insure that maximum surface area is available to the acidic aqueous medium. This prerequisite assures that sufficient metal is dissolved for the purpose of reducing the metal ions which are to be removed. The amount of metal particles included in the bed should be sufficient to provide at least a one to one weight ratio of the metal dissolved to the metallic ions which are to be removed. In order to accelerate the reduction reaction the concentration of the dissolved metal in the aqueous acidic solution should be preferably from one to three parts by weight in excess of the one part by weight of the dissolved metal necessary to reduce one part by weight of the contaminating ion. The use of filings or turnings from a machine shop is preferred. Iron filings are preferred since these filings generally possess a coating of oil. If the metal particles were uncoated, there would be a tendency for an oxidized surface to form and a surface of this nature is more resistant to acid, and thus the rate of dissolution of the metal would be retarded somewhat.

As stated above, the reaction taking place in the acidic medium involves the reduction of the contaminating ions from their highest valence state to their lowest valence state, and the concurrent oxidation of the dissolved metal from its elemental stage to its higher valence state. With respect to chromium, the hexavalent chromium present as a chromate is reduced to its trivalent state and if iron filings are used, the iron is oxidized from its metallic state to ferrous and ferric ions. The pH of the aqueous medium at this point may be within the range of from about 1 to 5. The preferred range, however, resides in the vicinity of from about 2.8 to 3.2. Within this range its efficacy of the oxidation-reduction reaction reaches its ultimate in terms of reaction time, completion of reaction and residence time in the apparatus stream. These factors are important in order to place the contaminating metal ions in the proper state for their subsequent removal.

In order to insure that all of the contaminant metal ions have been reduced to the proper state, the acidified aqueous medium containing the dissolved metal of the metal particles is first held and mixed for a short time and then delivered to a point where the pH of the system is converted to about 7 to 10, and preferably to the range of 7.5 to 9.5, by the addition of an alkaline material either in liquid, solid or powdered form. The alkaline material which can be added can be any one of or a mixture of sodium carbonate, sodium hydroxide, potassium hydroxide, potassium carbonate, calcium oxide, calcium hydroxide, magnesium oxide, magnesium hydroxide and ammonia. When the alkaline material is added to the acidic aqueous medium and the pH changes, the metallic ions present in the medium begin to form their respective hydroxides which are either insoluble or less soluble in an alkaline medium. Consequently, precipitation and flocculation commences and the precipitated particles begin to crystallize and increase in size. After reaching a particular size or weight, the particles settle to the bottom of the container. The precipitate may then be drawn off at this stage and the separated water discharged, or a separate settling area can be utilized to insure that all of the formed precipitate will deposit. The precipitate settles to the bottom of the container and the substantially metallic ion free water flows to the top of the container and is discharged at that point.

One of the important features of the invention is the use of recirculated precipitate. In this feature a portion of the precipitate formed during the flocculation and deposition stage is recirculated to a point in the system just after the dissolution of the metal particles and prior to the alkaline addition and flocculation stage. At the point of addition of the precipitate to the acidic aqueous medium, the pH of the medium becomes less acidic (pH 6) since the recirculated precipitate is alkaline. Because the medium is less acidic at this point, a medium is presented wherein initial precipitation and flocculation begins. The recirculated precipitates act as seeding or crystallizing beds and effectuates greater and faster particle growth. Accordingly, when the aqueous medium containing a portion of the dispersed precipitate is fed into the area where the alkaline material is added, partial precipitation has already occurred and complete precipitation of the remaining ions is obtainable in a shorter time.

Just prior to the flocculation stage of the process, it is sometimes desirable to add to the aqueous medium a coagulation or flocculation aid. The flocculant or coagulant is generally added in a quantity of from about 0.2 to about 50 parts by weight per million parts by weight of water (p.p.m.). The flocculants or coagulants which may be used include the tannins, starches, lignins, seaweed derivatives such as sodium mannuronate, sodium alginate and agar-agar or polymeric polyelectrolytes which are represented by those polymers, or the water soluble salts thereof, which contain the group

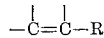

wherein R is nitrile, amide, carboxyl or carboxyl alkyl. Typical of such polymers are the polyacrylamides, polyacrylates, sodium polyacrylates and the various co-polymers thereof. Polymers of these types which have a molecular weight of between 5,000 and 15,000,000 are generally suitable. Such polymers are disclosed by U.S. Pat. 3,085,916 and can be used effectively in the range of from about 0.2 to 1 per million parts by weight of water. Moreover, coagulants or flocculating agents such as activated silica and sodium aluminate when used in the range of from about 10 to 50 parts by weight per million parts by weight of water have also found successful in the process.

Economic flocculation of the precipitate during the respective stages is obtained when from 5 to 10% of the throughput of the system is recirculated to the treating system as described above. With the addition of coagulation or flocculation aids, the rate of settling in the process is greatly enhanced. The remaining percentage of precipitate formed is generally separated using a common separating means such as a bag filter. The precipitate accordingly is collected in the bag filter and when the bag filter is completely filled, the precipitate can be easily handled and disposed of. On a 20 gallon per minute system approximately 5 to 10% of the throughput is recirculated, 1–2% of the throughput is filtered and the remaining percentage of throughput flows to discharge as contaminating ion free water.

As earlier stated many cooling systems because of environmental conditions, are prone to attack by microorganism growth. In order to eliminate this problem the conventional compositions which are added to the system for the prevention of scale and corrosion are commonly used in conjunction with a biocide or a combination of biocides. The biocides generally used are those which belong to the phenol family and include for example, the phenols themselves, the sodium, potassium and ammonium salts of the phenols, polyhalogenated phenols and phenates, etc. Moreover, organic sulfur and organic tin biocides have found a great deal of commercial use. However, because of the substantivity of these biocides, that is, their capacity not only to perform the function in the system but also to retain their biocidal properties upon discharge into streams, ponds, etc., these compounds have found only discriminate use and have been generally used well below the level desired.

The process of the present invention can be complemented by various modifications so as to eliminate the biocides which are normally discharged with waste water. The modifications require that after the acidic aqueous medium has passed through and in contact with the metal particles, that the medium then be passed through a unit containing calcite (calcium carbonate). Approximately 99% of the biocidal materials are absorbed by the calcite and the calcite has very little effect on the aqueous medium excepting for perhaps decreasing its acidity. However, at this stage of the process, it is desirable to begin to decrease the acidity so as to effectuate particle growth as is apparent since it is at this point that the recirculated precipitate is brought back into the system. Thus this modification blends well with the process as a whole. The process then remains unchanged until the waste water is discharged after settling occurs. However, at the discharge outlet there is connected a second unit which contains a bed of activated carbon. Since the filtrate from the separating means contains some biocide, the filtrate is passed with the discharge water through and in contact with the activated carbon. The activated carbon completely eliminates the remaining 1% of the biocidal materials which is unaffected by the preceding stages of the decontamination process.

THE APPARATUS STREAM

The apparatus stream may be generally described as comprising:

(1) a first acid-resistant liquid containing means adapted with means for receiving an aqueous acid medium, of allowing the medium to flow through in contact with a bed of metal particles contained in said liquid containing means and of delivering the resulting medium to a second acid-resistant liquid containing means;

(2) said second liquid containing means adapted with means for receiving and allowing the aqueous acid medium received from said first liquid containing means to mix and a means for delivering the aqueous acid medium to a flocculating means;

(3) said flocculating means being equipped with a means for receiving the resulting medium, a means for accepting delivery of an alkaline material from an independent source, a stirring means and a means for allowing the aqueous medium containing the dispersed medium formed in said flocculating means to pass to a settling means, and (4) a settling means which will hold the medium received from the flocculating means for a time sufficient to permit the deposition of the dispersed medium contained in the aqueous medium received from the flocculating means, said settling means being equipped with a discharge outlet to discharge the separated aqueous medium.

The apparatus stream is preferably modified so that the settling container and the flocculating container are each equipped with a means for recirculating a portion of the throughput containing some of the precipitate deposited in the bottom areas thereof back to the apparatus stream and more specifically, to the second acid resistant containing means. The recirculation modification serves two purposes. The modification provides a way to utilize a portion of the precipitate as a seeding or crystalizing initiator, thus the rapidity of the final precipitation and flocculation is enhanced without use of expensive flocculating aids. Moreover, the modification permits the apparatus stream to be installed in smaller areas and eliminates the need for long settling times and/or large settling tanks.

The apparatus stream also preferably possesses a means for recirculating the filtrate from a secondary separating means such as a bag filter, back to the apparatus stream. This modification realizes a fail-safe system since some of the initial filtrate obtained after start-up may not be entirely free of contaminants. In order to avoid discharge of the contaminated filtrate, the filtrate is recirculated for retreatment.

In the initial start-up of many systems, it requires some time to adjust the treatment and apparatus to obtain a fully effective system. This modification allows for this period.

DESCRIPTION OF THE DRAWING

The apparatus stream of the invention possesses many potential variations however, for the sake of specificity, the one depicted in the drawing will be described in terms of the process involved.

Conduit 1, which conveys the water (aqueous medium) to be treated from the particular system involved, may be connected directly to the blowdown, manual or automatic, or to the discharge of any system where the water of the system has been previously treated with chromates, phosphates, zinc compounds or any combination of these to inhibit scale formation, corrosion, etc. In many instances cooling systems not only contain scale and corrosion inhibitors but also biocides to control microorganism growth. In oil refining processes, oil sometimes leaks into the cooling water and is carried with the water. The present process and apparatus provides a means to remove not only the undesirable multivalent ions but also the biocides and the dispersed oil.

Conduit 1 carries the water to rotameter 2 which measures the flow of the water through conduit 3 which leads to acid-resistant liquid containing means (tank) 6. Leading into conduit 3 is conduit 4 which is connected to storage unit 5 which contains a supply of acid. The acid flows at a predetermined rate, depending upon the concentration of the acid, the flow rate of the water entering the system and the pH of the water, from unit 5 through conduit 4 and into conduit 3 to acidify the aqueous solution being pumped to acid-resistant liquid containing means 6 which contains metal particle bed 7. The acidified water then flows preferably upwards for better contact, through and in contact with bed 7. A portion of the metal particles is dissolved during this stage and the aqueous acid solution containing the dissolved metal flows from liquid containing means 6 through conduit 8 which is adapted with eductor 9 which acts to direct the flow of the medium to acid-resistant mixing tank 10. In tank 10 the aqueous acidic solution containing the dissolved metal is mixed and held to ensure as complete a reduction of the multivalent ions as possible. Eductor 9 also acts to withdraw or syphon from sections 12a and 12b a portion of the throughput which contains some precipitate and recirculates this precipitate as seeding, crystalizing or pre-flocculating beds in mixing tank 10.

When the system is just started, some of the filtrate which empties into trough 26 contains some residual ions or biocides and eductor 9 with valve 29 opened and valve 30 closed syphons this portion off through conduit 28 to permit retreatment of this filtrate. Thus a fail-safe system is affected and when the filtrate is free of the contaminants, the valves are reversed and discharge of the filtrate takes place.

Although conduit 8 is shown in the drawing as extending into and to the lower portion of tank 10, this is not necessary although preferred, since this modification does ensure maximum mixing. The acidified aqueous medium in tank 10 is then conveyed through conduit 11 to tank 12. Although tank 12 is shown as compartmentalized into sections 12a and 12b, the separate compartments may be independent tanks equipped with an appropriate connecting conduit.

Section 12a of tank 12 is equipped with mixing blades designated as 15. Mixing blades are connected to a driving means or motor 13 through shaft 14. The stirring apparatus slowly (1-35 r.p.m.) but thoroughly agitates the medium contained in section 12a. Section 12a is also equipped with pH meter 18 which continuously measures the pH of the medium in flocculating section 12a. Alkaline material from storage tank 17 is delivered through conduit 16 to flocculating section 12a by means of an adjusted gravity-feed mechanism. Tank 12 contains commonwall 19 which, since it does not extend the full length of the tank, provides an opening through some of the larger portions of the precipitate formed fall to the conical portion of section 12a. However, some particles remain suspended and flow through the opening to section 12b, which can more specifically be referred to as a settling tank.

In settling tank 12b the small particles of precipitate have the opportunity to collect and when large enough, to settle in the conical section of that tank. The substantially precipitate-toxic metal ion free water flows to discharge through outlet 20. Sections 12a and 12b are equipped with conduits 21a and 21b which are connected to recirculating line 22. Line 22 serves two purposes in that it recirculates a portion of the throughput containing some precipitate from the conical sections of 12a and 12b to conduits 22 and 24. Conduit 22 by way of conduit 23 supplied conduit 8 through eductor 9 with a potrion of the throughput while conduit 24 takes a portion of the precipitate to filtering device 25 which may be a bag filter. Filtering device 25 separates the precipitate and allows the filtrate to fall in trough 26 which is equipped with conduits 27 and 28. As earlier described, when the treatment is first started, some filtrate which falls to trough 26, contains some residual ions and/or biocides. Accordingly, during this period, valve 30 of conduit 27 is closed and valve 29 of conduit 28 is opened. Eductor 9 then syphons this filtrate back into the system for additional treatment. When the filtrate is substantially free of undesirables, valve 29 is closed and valve 30 is opened and the filtrate is directed to discharge through conduit 27.

Valves 31 and 32 contol the flow of the medium from sections 12a and 12b. It has been determined that recirculation of from 5 to 10% of the throughput is most desirable. Accordingly, eductor 9 in conjunction with valve 32 is regulated to produce this result. Moreover, it has also been found that best results are achieved when the filtering device 25 receives approximately 1% of the throughput. The remaining percentages of throughput is discharged as decontaminated supernatant through outlet 20.

To more specifically describe the nature of the apparatus stream and the dimensional requirements necessary for effectuating the desired objectives, an apparatus stream which is capable of handling 20 gallons of waste water per minute will be described.

The conduits of a 20 gallon per minute system can effectively be one and one-half inches in diameter. By conduits of course, is meant any piping, such as polyvinyl chloride tubing which provides the flow lines of the apparatus or the feed lines for acid and alkaline material delivery.

The first liquid containing means which contains the metal particles is approximately 5 feet in height and approximately 20 inches in diameter, while the second liquid containing means where the acidic aqueous medium is held and allowed to mix has a capacity of 50 gallons and is approximately 2 feet in diameter and 3 feet in height.

Flocculating section 12a is approximately five and one-half feet in height. The flocculating tank and the settling tank, although not necessarily so, are square shaped with sides measuring 30 inches by 30 inches. Settling section 12b is depicted in the drawing as being of approximately the same size as the flocculating section, however this section can be made somewhat larger in capacity in order to insure that proper settling occurs. This section can be either square in shape or can be modified in its shape as to accept a multitude of settling tubes in such a manner as to station the tubes at an angle with a vertical wall of the section. Sections 12a and 12b possess con shape bottom portions to allow proper collection of the precipitate. A 45° angle on the conical portion has proven to be satisfactory for the purpose.

Section 12a is provided with motor 13 which drives shaft 14. This shaft is round with a ½ inch diameter and measures approximately three and one-half feet in length.

Cedar paddles measuring 15 inches in length, ¼ inch in thickness and one and one-half inch in width are attached to brackets which are one foot in length. The mixing device provides sufficient agitation without destroying or affecting floc-formation.

The bag filter is made of any material which will effect proper separation and measures approximately 3 feet in length and when fully expanded, measures 9 to 12 inches in diameter. Although only one bag filter is shown in the drawing, it is evident that a number of bag filters may be used either in a series, parallel or independently.

As earlier stated the inventive process and apparatus has been found to be highly successful in not only removing undesirable and toxic metal ions from the water but also has been found to be quite effective in removing toxic biocides and oil from these same waters.

Because of the humid and high temperature conditions found in cooling tower systems, these systems are treated not only with the appropriate scale and corrosion inhibiting compositions but also with various bactericides, fungicides and algicides, which are collectively commonly referred to as biocides. The humid and high temperature conditions in these systems are such that they support the growth of microorganism colonies. These colonies in cooling towers attack the wooden structures commonly found therein and, in order to eliminate these problems, various biocides are fed into these systems. The biocides which have been found to be quite effective for the purpose are those which belong to the phenolic family such as the phenols, phenates and halo-substituted phenates such as the pentachlorophenates, trichlorophenates and the salts thereof such as the sodium and potassium salts.

Because of the substantivity of the chlorophenates, for example, these compounds have not been used to their full capacity since upon discharge of the phenate containing water into streams, ponds etc., the phenates have some effect upon both the plant and marine life existing therein. Accordingly, these compounds have been used very discriminately.

By virtue of the present invention and with various modifications to the apparatus stream, these biocides can be removed so as to insure a substantially biocide free discharge water flowing to the discharge stream or pond.

Referring to the drawing with particular regard to this embodiment, the apparatus stream is modified to the following extent. After tank 6 and before eductor 9, conduit 8 is connected to a separate acid resistant tank containing a bed of calcite. The acidic aqueous medium containing the biocide is permitted to flow through and in contact with the calcite and out an outlet to and through eductor 9.

The apparatus stream remains unchanged up to discharge outlet 20. Discharge outlet 20 is connected using an appropriate means with a tank or unit bearing an activated carbon bed. The water discharged through outlet 20 and the filtrate dischrged through conduit 27 are directed into the unit and through and in contact with the activated carbon bed. The unit is equipped with a discharge outlet which delivers the water after passage through the bed to discharge. The modified system is quite effective since approximately 99% of the biocide is removed in the calcite unit and the remaining 1% is removed in the activated carbon bed.

With respect to oil removal, the apparatus stream remains unchanged, that is, the apparatus is the same as when chromate, phosphate and zinc ions are to be removed. The actual removal mechanism apparently involves the absorption or the occlusion of the oil in the precipitating hydroxides during the flocculation stage.

Having thus described the apparatus of the drawing generally, certain components of the apparatus stream of the invention will now be discussed together with various modifications which can be made.

In many systems the pressure of the blowdown or the flow of the water at discharge from the system will be sufficient as the driving force for the inventive system. However, in many instances where it is necessary because of preset conditions with respect to acid and alkaline feed, it is preferable to connect conduit 1 to a pump which is capable of delivering and pumping the water to be treated in a capacity such that the throughput of the system will be satisfied. For example, if the quantity of water to be treated is approximately 20 gallons per minute, the pump can be any suitable pump which is capable of furnishing the apparatus stream with this quantity. As is apparent, the pump will maintain a continual and uniform supply of the water to be treated. Since the metallic ion and biocide content of a water will not vary appreciably with a given treatment level in the system from which the water to be treated is obtained, the acid delivery from the storage source can be adjusted so as to supply the necessary acid for the particular quantity of water being treated to obtain the desired pH.

The acid delivery system is depicted in the drawing as being a gravity feed system and a system of this type can be mechanically modified to permit only a certain quantity of acid to be added to the water. However, if desired, the acid delivery system can be modified with a diaphragm acid pump which is capable of delivering an acid supply continually and uniformly. A pump which is capable of delivering from 0.2 to 20 gallons per day of 66° Baumé acid should satisfy most situations.

As another modification, a pH meter may be installed in conduit 3 after the acid feed and if desired, this pH meter can be such as to electrically signal the pump for added delivery in the event that the pH is not that as desired.

Tank 7 as earlier stated, should be fabricated of an acid resistant material since the pH of the medium contained therein will be in the vicinity of from about 2 to 5. Eductor 9 as tank 7 should be fabricated of a material which is acid resistant since the eductor will be exposed to primarily acidic conditions. The eductor by way of some explanation is not limited to any particular design and any apparatus which will not only direct the flow of the acidic medium through conduit 8 and at the same time provide a syphoning effect to withdraw some precipitate from tank 12 through conduits 21a and 21b, through conduit 22 and conduit 23 to conduit 8, and likewise water from trough 26 through conduits 28 and 23 to conduit 8, will be suitable for the purpose. The purpose of the eductor is to furnish formed precipitate to mixing tank 10 so as to allow the precipitate to act as a seed bed or pre-floc stage for the formation of the desired precipitate prior to its delivery to primary precipitating and flocculating section 12a.

As earlier described, section 12a is equipped with a means for receiving an alkaline material from storage tank 17 and accordingly should be somewhat alkali resistant. As depicted in the drawing, the alkaline material may be delivered by gravity feed which is modified so as to permit the proper amount of alkaline material to feed into section 12a. The amount fed, of course, depends upon the flow rate of the aqueous medium in the system, the pH of the water and the concentration of the alkaline material. If a more exacting control is desired, storage tank 17 and conduit 16 may be modified so as to carry a pump which will insure delivery of a constant and uniform supply of alkaline material in the same manner as the acid delivery. The pH meter 18 will serve to assure that the proper pH range is maintained during that phase of the operation and if the quantity of alkaline material delivered must be changed, the gravity feed means or the pump means may be modified accordingly.

As a preferred adaptation, the pH meter can be electrically connected to a second or auxiliary pump. This modification would protect against the possibility of the pH dropping to a lower value than desired. The pH meter in this case would be set at a particular value and if for some reason the actual value of the medium fell below that value, the pH meter would be adapted to send a signal to the pump which when received by the pump would actuate it. The pump by delivery of additional alkaline material would bring the pH value back to that desired, at which time the signal from the pH meter would cease together with the pump action. Accordingly, a fail-safe system is provided utilizing the aforementioned adaptation.

As an additional and preferred modification of the apparatus stream is the provision for a point for the addition of a coagulant or flocculation aid. Preferably the point of addition should be after mixing tank 10 and before section 12b of tank 12, and most preferably, at and into conduit 11. The addition of the coagulant or flocculation aid hastens the precipitation or deposition of the insolubles formed in section 12a. Similarly as with the acid and alkaline deliveries, the coagulant may be fed continually either by gravity or by pump. The materials suitable for this purpose and the quantities necessary to achieve this purpose were earlier discussed.

Although section 12a, which may be a separate settling tank, is depicted in the drawing as merely a plain tank, the tank is preferably fitted in the upper portion thereof and below outlet 20 with a multitude of settling tubes which are set in at an angle to the sides of the tank. These tubes whether cylindrical or hexagonal in shape are fitted side by side to form a honeycomb type structure. The smaller particles of precipitate which do not settle in the lower conical sections of sections 12a and 12b flow upward and into the settling tubes. The small particles collect in the tubes and settle to the lower walls thereof, thus allowing upward flow of the clean water. When sufficient particles have agglomerated, the larger agglomerates attain sufficient weight and slip from the tubes to the tank bottom. Tubes which are preferred for the above purpose are approximately 2 to 3 feet in length and about ¾ to 1 inch in diameter and are generally molded from a thermoplastic material.

SPECIFIC EMBODIMENTS

Having thus generally described the process and the apparatus of the invention, more specific embodiments thereof will follow. However, these embodiments are included as merely representative of the invention and are not to be construed as limitative thereof.

EXAMPLE 1

An industrial cooling system which required 3,500 gallons of water per minute to obtain the necessary cooling was being treated with a zinc, chromate and phosphate composition. In order to maintain proper corrosion and scale control the water was treated so as to have a level of 20 p.p.m. of chromate, 2 p.p.m. of zinc as zinc ion, and 10 p.p.m. of phosphate. A pH of 6.5 was maintained in the cooling water. In order to maintain the proper levels of the treatment composition the system was blown down to the extent of 6 gallons of water per minute. The blowdown discharge of the cooling system was connected to a conduit such as that depicted on the drawing as conduit 1. The waste water containing the specific ions in question was sent through rotameter 2 and into conduit 3. While in conduit 3 sulphuric acid having a concentration of 66° Baumé was added to the waste water in sufficient quantity to reduce the pH to approximately 2.7. The acidified aqueous medium was then directed in an upward flow through and in contact with the bed of iron filings 7 contained in first liquid containing means 6. At this point a proportionate amount of the filings were dissolved by the acid and a reduction occurs to the extent that the hexavalent chromium of the chromate ion is reduced to a trivalent state. The iron filings upon being dissolved and reacting with the contaminating ions in solution affected the reduction. The iron of the iron filings accordingly was oxidized from elemental iron to the ferrous and ferric states. Accordingly, the dissolved iron because of its sequential oxidation affects a significant quantity reduction of the contaminating ions. The aqeuous acidic medium containing the dissolved iron possessed a pH of approximately 4.0. The aqueous medium was discharged from the iron filings tank into conduit 8 and through eductor 9 to second liquid containing means 10. Eductor 9 is of such design that it syphons from the conical portion of tank 12 a small proportion of the throughput containing some already formed precipitate. The amount recirculated represented approximately from 5 to 10% of the throughput or more specifically from .3 to .6 g.p.m. The syphoned throughput flowed through conduit 22 to conduit 23 and into eductor 9. The pH of the aqueous medium at this point measured about 6.0 because of the addition of the alkaline throughput. At this stage of the process some of the iron, chromate and zinc ions began to precipitate because of the less acidic condition of the medium, as effectuated by the addition of the already formed precipitate syphoned from tank 12. In second liquid containing means 10, the aqueous medium containing the dispersed precipitate was allowed to mix and particle build up was allowed to progress. The medium was then delivered to flocculating section 12a through conduit 11. In section 12a lime was added in order to bring the pH of the medium to approixmately 8.5. At this stage of the process the particle build up became very extensive.

As depicted in the drawing, flocculation tank 12a is equipped with a moderate speed agitation system. The stirring apparatus which has a speed of approximately 12 to 35 r.p.m. agitated the system to the extent that smaller particles agglomerated with the larger particles and the larger particles accumulated in the conical section of flocculation tank 12a. However, some of the particles of precipitate were small in size and consequently passed through the opening which connects 12a with 12b and were held in tank 12b for a time sufficient to allow the particles to increase in size and fall to the conical section of that tank.

In settling tank 12b the water containing no dispersed material passed upwardly to discharge through outlet 20, while 1 to 2% of the throughput of the system was drawn from tank 12b through conduit 21b to bag filter 25. Valve 31 was regulated to permit this flow ratio to the bag filter. At this point the precipitate, which was compacted in the bag filter, was rendered manageable and the separated water or filtrate which drained into trough 26 was directed to final discharge through valve 30 and conduit 27.

In order to determine the long range effectiveness of the particular system, the system was allowed to operate over a period of six months. During the system's run, periodic samples of the water were taken from both outlet discharge 20 and from conduit 27. Analyses were then conducted in a conventional manner to determine the chromate, zinc, and phosphate ion content. These analyses illustrated conclusively the effectiveness of the system since no chromate ion, ferric or ferrous ions or zinc ions were detected as present in the effluent or discharge water. There was a slight trace of phosphate and in some instances 0.2 part per million of trivalent chromium were detected. However, low discharge quantities of chromium in this state is permitted by the regulations and consequently its discharge presented no problem.

In this example as in the following examples where the apparatus was used, the initial filtrate from the bag filter was recirculated for subsequent treatment during the initial stages of the run. After the filtrate exhibited no contaminating ion content, the filtrate was allowed to flow to discharge. Likewise about 5% of the throughput containing some precipitate was recirculated for further treatment and to enhance precipitate growth. This recirculation unlike the recirculation of the filtrate continued throughout the systems trial.

EXAMPLE 2

In order to determine the effective throughput capacity of the process and the apparatus stream, the apparatus was connected to a cooling water system blowdown. The cooling system in this case required 10,000 gallons per minute in order to attain the desired cooling of the process stream which it was servicing. To maintain proper treatment level of the zinc, chromate and phosphate composition, blowdown ran approximately 20 gallons per minute. The treatment levels were substantially the same as those used in the cooling water system described in Example 1. The waste water of this cooling system was treated exactly in the same manner as that treated in Example 1 and again and in spite of the increase, the system operated quite effectively and gave substantially the same results as those obtained in Example 1.

EXAMPLE 3

The apparatus of the invention was modified in accordance with the description of the present specification for the removal of biocides from the waste water of a cooling system similar to that as described in Example 2. The cooling system, in this instance, contained in its waste water 40 parts per million of chromate ions, five parts per million of phosphate ions and 5.6 parts per million of zinc ion. Because the cooling tower had been experiencing microorganism attack, the system was also treated with approximately 15 parts per million of the sodium salt of pentachlorophenate. The addition of this biocide completely eliminated any microorganism attack on the cooling tower structure. Accordingly, the waste water from the cooling system contained a proportionate amount of the biocide. The waste water was first acidified to a pH level of 3.00. The acidified waste water was then passed through a bed of iron filings according to the process as described. The acidified waste water was then directed through a unit containing calcite. After passage through the calcite unit, the waste water was treated according to the procedure set forth in Example 2 with the exception that the pH during the flocculating step at which point the alkaline material was added, was made to be approximately 9.5. The contaminant free water being discharged through outlet of the settling tank and the filtrate collected in trough 26 were directed to a unit which contained activated carbon. The waste water was allowed to flow through and in contact with the activated carbon and then discharged.

Again the system was allowed to operate for a number of months in order to determine its long range effectiveness. During this period various water samples were taken from the discharge of the activated carbon unit in order to ascertain the ion levels together with the phenate concentration in the water during its discharge. Conventional analytical methods revealed that the water was essentially free of the undesirable metal ions and that there was no indication that the biocide was ever present in the water.

EXAMPLE 4

In order to determine the effectiveness of various other metals, a large supply of a typical discharge water from a cooling tower system was made in the laboratory by adding (i) a sufficient portion of a water soluble chromate to produce a level of 20 parts per million chromate ions (ii) sufficient amount of a water soluble zinc compound (zinc chloride) so as to have approximately 2 parts per million of zinc ion, and (iii) sufficient phosphate compound to have a level of 10 parts per million of the phosphate. The solution was adjusted to a pH of approximately 6.5 and brought to a temperature which was commensurate with the waste water of a normal cooling system. A small proportion of this water was acidified to a pH of 2.7 with concentrated hydrochloric acid. The water was allowed to flow downward and through a bed of aluminum particles. The acidified solution containing the dissolved aluminum was collected in a separate container, mixed thoroughly and then brought to a pH of approximately 8.5 by the addition of sodium hydroxide. At this point, a coagulant aid which was an acrylic acid polymer having a molecular weight of approximately four million was added in an amount which represented about .2% by weight was then stirred for a short time and the precipitate which formed was allowed to settle. The clear water was then decanted and subjected to analytical testing to ascertain the ion content thereof. The analysis showed the water to be completely free of any chromate, zinc or phosphate ions.

EXAMPLES 5 THROUGH 7

Example 4 was repeated with the exception that magnesium particles were used in Example 5; zinc particles were used in Example 6 and a mixture of iron filings and aluminum filings were used in Example 7. In each of the respective examples it was ascertained that the supernatant or discharge water was substantially free of chromate, zinc, phosphate and ions of the metal particles used.

EXAMPLES 8 THROUGH 11

Examples 4 through 7 were repeated with the exception that sulfuric acid (conc) was used in place of the hydrochloric acid and approximately 22 p.p.m. of trichlorophenate (sodium salt) was added to the solution to be treated. After the acidified solutions were passed through the filings, the medium obtained was then passed through a calcite bed. The resulting medium was treated in accordance with Examples 4 through 7. However, the supernatant prior to its analysis was passed through and in contact with a bed of activated carbon.

The supernatant was then subjected to analysis for the respective ion and biocide contents and was found to be completely free of the undesirable ions and phenate.

EXAMPLE 12

A cooling water system which serviced an oil refining process system was treated with a combination of a zinc salt, a chromate salt and a phosphate salt in such quantities to maintain a treatment level of 30 p.p.m. of chromate ion, 4 p.p.m. of phosphate ion and 3.4 p.p.m. of zinc ion. A sample of the blowdown waste water was taken, and it was determined that the water contained approximately 50 parts per million of dispersed oil which was apparently due to some leakage in the refining system.

The waste water or blowdown of the system which averaged approximately 20 gallons per minute, was treated with concentrated sulfuric acid to bring its pH to about 2.6 and then passed through iron filings. The acidic acid solution, which contained approximately 45 p.p.m. of dissolved iron, was mixed mildly and a portion, 0.2% by weight, of an acrylic acid polymer having a molecular weight of 4,000,000 was added to the solution. Magnesium oxide was then added to the solution to bring the pH to 7.5. Precipitate immediately formed and settled. A portion of the supernatant was analyzed and found to possess no ferric ions, chromic ions, zinc ions or phosphate ions and was found to be completely devoid of any dispersed oil.

This example established conclusively that the invention removes not only the undesirable ions but also any dispersed oil which would normally be discharged into and therefore contaminate the natural waters.

EXAMPLE 13

As earlier stated, the present invention finds applicability in any industry where the waste water contains ionic chromium, ionic zinc, etc. To illustrate this versatility, the invention was used in conjunction with the discharge, or waste water, of the chromium plating process utilized in the metal finishing industry. The discharge, or waste water, of a general chromium industrial plating industry, unlike that of cooling tower waste water, contains a substantial amount of hexavalent chromium and trivalent chromium. This combined amount may range anywhere from 1 to 20% by weight, or more specifically, in the range of 10,000 to 200,000 p.p.m. The hexavalent chromium content varies widely and depends upon the chromic content of the bath, whether running or still rinses are used, and on the percent by volume of dragout. In order to ascertain the effectiveness of the present invention, a representative sample of waste water from this industry was produced in the laboratory. The water contained approximately 35,000 p.p.m. of chromate i.e. chromium in its hexavalent state which was supplied by the addition of the appropriate amount of chromic acid. The pH of the chromic acid solution was approximately 4.2. Because chromic acid is a buffer, sulfuric acid (66° Baumé) was added to lower the pH to 2.9. The acidic water was then passed through and in contact with a bed of iron filings with the residence time of the acidic water being in contact with the iron filings for time sufficient to dissolve in excess of 25,000 p.p.m. of iron. The resulting solution was then stirred in a separate container for a short time (1 minute). Powdered lime (calcium oxide) was then added to the solution to bring the pH up to 8.5. Precipitate immediately formed and the medium was stirred mildly for a short time. The medium was allowed to stand and after a short period (approximately 10 minutes), when a substantial portion of the particles had settled, a portion of the supernatant solution was decanted and subjected to analysis for chromium content. The analysis revealed that no chromic ions were present in the water decanted.

EXAMPLE 14

In order to establish the effectiveness of the recirculation embodiment of the invention, Example 13 was repeated with the exception that approximately 8% by weight of a dispersion of the aqueous medium containing a small proportion of the dispersed precipitate obtained in Example 13 was added to the acidic water just after passage through the ion filings but prior to the addition of the lime. It was noted that particle size increased very rapidly upon the addition of the lime and that a substantial portion of the precipitate had formed and settled in about seven minutes. Again, a sample of the supernatant solution was analyzed and found to be free of chromic ions.

EXAMPLES 15 THROUGH 17

Example 13 was repeated excepting that aluminum particles were used in Example 15, magnesium particles were used in Example 16 and zinc particles were used in Example 17. Although the economics of the processes utilizing the aluminum, magnesium and zinc particles were not as attractive as with the use of iron particles, the analyses of the treated water in each instance revealed that there was no detectable hexavalent chromium present in these waters.

Having thus described the invention, what we claim is:

1. A process for removing from an aqueous medium toxic multivalent metals which are in salt form and are dissolved in said aqueous medium and/or oil dispersed in said medium, which toxic salts are selected from the group consisting of phosphates and toxic salts which contain a metal ion of the group of chromium in its hexavalent state, chromium in its trivalent state, and zinc in its bivalent state and mixtures of salts containing the respective ions and mixtures of said phosphates with said multivalent ions, which process comprises;

(1) acidifying the aqueous medium containing the dissolved salt or salts;

(2) passing said acidified aqueous medium through and in contact with a bed of particles of a metal to thereby dissolve a portion of said particles, said metal of the particles being capable in its dissolved state in said acidic medium, of reducing the metal ions of said dissolved salts to their lowest valence state and in turn being oxidized to its higher valence state;

(3) after substantially all of the metal ions of said dissolved salts have been reduced to their lowest valence state, converting the aqueous acidic medium to an aqueous alkaline medium where the reduced metal ions of said dissolved salt and the oxidized metal ions derived from the metal particles form a precipitate which is insoluble in the alkaline medium;

(4) allowing the combined precipitate of the metals to form and settle; and (5) separating the precipitate from the remaining aqueous medium, wherein after step (2) and prior to step (3) a portion of a precipitate as separated in step (5) is mixed with the aqueous acidic medium to enhance crystal and precipitate formation.

2. A process according to claim 1 wherein just prior to or during step (3) a coagulant aid is added to the aqueous medium.

3. A process according to claim 1 wherein the metal of the metal particles is selected from the group consisting of iron, aluminum, magnesium, zinc and mixtures thereof.

4. A process according to claim 3 wherein the aqueous medium is acidified with sulfuric acid and wherein the aqueous acidic medium is converted to the alkaline aqueous medium in step (3) by the addition thereto of an alkaline material selected from the group consisting of sodium carbonate, sodium hydroxide, potassium hydroxide, potassium carbonate, calcium oxide, calcium hydroxide, magnesium hydroxide, magnesium oxide and ammonia.

5. A process according to claim 3 wherein the aqueous medium is acidified to a pH of from about 2.6 to about 3.0, and wherein the aqueous acidic medium is converted to a pH of from about 7.5 to about 8.7.

6. A process according to claim 5 wherein just prior to or during step (3) a coagulant aid is added to the aqueous medium.

7. A process according to claim 3 wherein the aqueous medium contains in addition to said multivalent metal salts, a biocide or a mixture of biocides and said aqueous medium after having been acidified as in step (1) and prior to its passage through the bed of step (2) is passed through a bed of calcium carbonate, and wherein the aqueous medium separated in step (5) is passed through a bed of activated carbon to remove any residual biocide.

8. A process according to claim 7 wherein just prior to or during step (3) a coagulant aid is added to the aqueous medium.

9. An apparatus stream for the removal of various substituents dissolved and/or dispersed in an aqueous medium comprising:

(1) A first acid-resistant liquid containing means adapted with means for receiving an aqueous acid medium, of allowing the medium to flow through and in contact with a bed of metal particles contained in said liquid containing means and of delivering the resulting medium to a second acid-resistant liquid containing means;

(2) said second liquid containing means adapted with means for receiving and allowing the aqueous acid medium received from said first liquid containing means to mix and a means for delivering the aqueous acid medium to a flocculating means;

(3) said flocculating means being equipped with a means for receiving the resulting medium, a means for accepting delivery of an alkaline material from an independent source, and a means for allowing the aqueous medium containing the dispersed medium formed in said flocculating means to pass to a settling means, and (4) a settling means which will hold the medium received from the flocculating means for a time sufficient to permit the deposition of the dispersed medium contained in the aqueous medium received from the flocculating means, said settling means being equipped with a discharge outlet to discharge the separated aqueous medium, wherein between said first and said second liquid containing means there is provided a unit for receiving said aqueous acid medium and said unit is equipped with a means for receiving said acid medium and for delivering such to said liquid containing means after said medium has passed through and in contact with a bed of material contained in said unit, said system further being provided with a unit capable of receiving the discharged aqueous medium from the settling means and of discharging said medium after it has passed through and in contact with a bed of material contained therein, and wherein said flocculating container and said settling container are each equipped with a means for recirculating a portion of precipitate collected in the bottom areas thereof to said second acid-resistant containing means.

10. An apparatus stream in accordance with claim 9 wherein the metal of the metal particles contained in said first acid-resistant liquid containing means is selected from the group consisting of iron, aluminum, magnesium, zinc and mixtures thereof.

11. A system according to claim 9 wherein said recirculating means is connected by an appropriate conduit to an eductor which is positioned and connected between said first and said second liquid containing means.

12. A system according to claim 11 wherein said recirculating means are further connected by an appropriate means to a seocndary separating means.

13. A system according to claim 12 wherein the metal of said metal particles which are contained in said first acid-resistant liquid containing means is selected from the group consisting of iron, aluminum, magnesium, zinc and mixtures thereof.

References Cited

UNITED STATES PATENTS

| | | | |
|---|---|---|---|
| 1,771,518 | 7/1930 | Adler et al. | 210—62X |
| 2,116,053 | 5/1938 | Urbain et al. | 210—50 |
| 2,128,569 | 8/1938 | Velz | 210—46 |
| 2,204,703 | 6/1940 | Sanders | 210—205X |
| 2,661,333 | 12/1953 | Schein | 210—61 |
| 3,171,804 | 3/1965 | Rice | 210—53 |
| 3,284,350 | 11/1966 | Williamson | 210—46 |
| 3,317,047 | 5/1967 | Hansen | 210—62X |
| 3,325,401 | 6/1967 | Lancy | 210—50X |
| 3,398,089 | 8/1968 | Mackrle et al. | 210—195X |
| 3,472,764 | 10/1969 | Culp et al. | 210—7 |

OTHER REFERENCES

Hoover, C. R., et al., Disposal of Waste Liquors from Chromium Plating, Ind. Eng. Chem., January 1941, vol. 33, No. 1, pp. 131–134.

MICHAEL ROGERS, Primary Examiner

U.S. Cl. X.R.

210—30, 61, 195, 196, 202, 205